United States Patent

[11] 3,601,035

| | | |
|---|---|---|
| [72] | Inventor | Charles T. Linder<br>Harris, Minn. |
| [21] | Appl. No. | 8,628 |
| [22] | Filed | Feb. 4, 1970 |
| [45] | Patented | Aug. 24, 1971 |
| [73] | Assignee | Land O'Lakes, Inc.<br>Minneapolis, Minn. |

[54] APPARATUS FOR TREATMENT OF PLASTIC MATERIAL
4 Claims, 5 Drawing Figs.

[52] U.S. Cl. .................................................... 99/244,
99/118
[51] Int. Cl. ...................................................... A23d 3/02
[50] Field of Search .......................................... 99/244,
409, 118, 119, 122; 31/35; 259/104

[56] References Cited
UNITED STATES PATENTS

| | | | |
|---|---|---|---|
| 2,302,574 | 11/1942 | Richardson et al. ........... | 99/244 UX |
| 2,576,183 | 11/1951 | Irvine et al. .................... | 99/409 X |
| 2,745,643 | 5/1956 | Kleinlein ....................... | 259/104 |
| 3,230,581 | 1/1966 | Tyson et al. ................... | 259/104 X |
| 3,468,518 | 9/1969 | Koch ............................ | 259/104 X |

*Primary Examiner*—Robert W. Jenkins
*Assistant Examiner*—Arthur O. Henderson
*Attorneys*—Fredrick E. Lange and William Babcock ABSTRACT: New apparatus is taught for feeding and moving plastic material into and through a conduit. The apparatus has a hopper with an open mouth for receipt of plastic material. The discharge end of the hopper is connected to the entrance of a conduit wherein treatment of the plastic material takes place.

At least one rotatable helical screw is located in the bottom of the hopper. Normally two such screws rotatable in opposite directions are in the bottom, Above the screws, in a spaced relationship from them, is a rotatable drum. This drum is disposed on an axis transverse to the axis of the screws. It has in its periphery a plurality of axially aligned radially extensible and retractable vanes. At least a portion of the periphery of the drum is exposed to the interior of the hopper adjacent the discharge end of it. Radially extended vanes of the drum press plastic material in the hopper toward the helical screws.

A shoeplate member is interposed in the space between the drum and helical screws. The shoeplate has a blunt leading edge substantially parallel to the axis of the drum. This blunt leading edge lies adjacent the periphery of the drum. It is located, in terms of a drum radial angle, between 5° and 30° toward the hopper from a base plane perpendicular to the helical screws within which the drum axis lies.

Means are provided for radially extending the drum vanes outwardly from the drum periphery so as to place them in a position to press plastic toward the helical screws in the portion of drum rotation exposed to the interior of the hopper. Also, means are provided for retracting the vanes prior to passage of the drum periphery over the blunt leading edge of the shoeplate member.

Patented Aug. 24, 1971  3,601,035
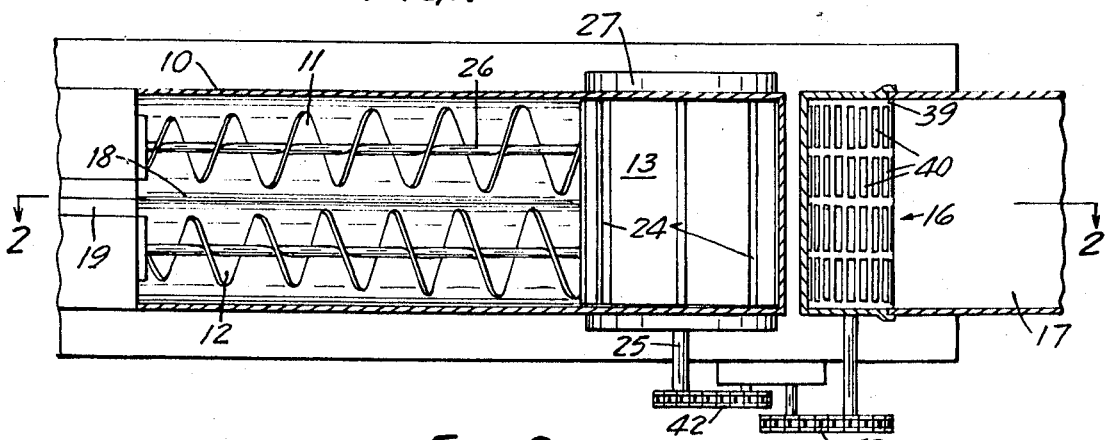
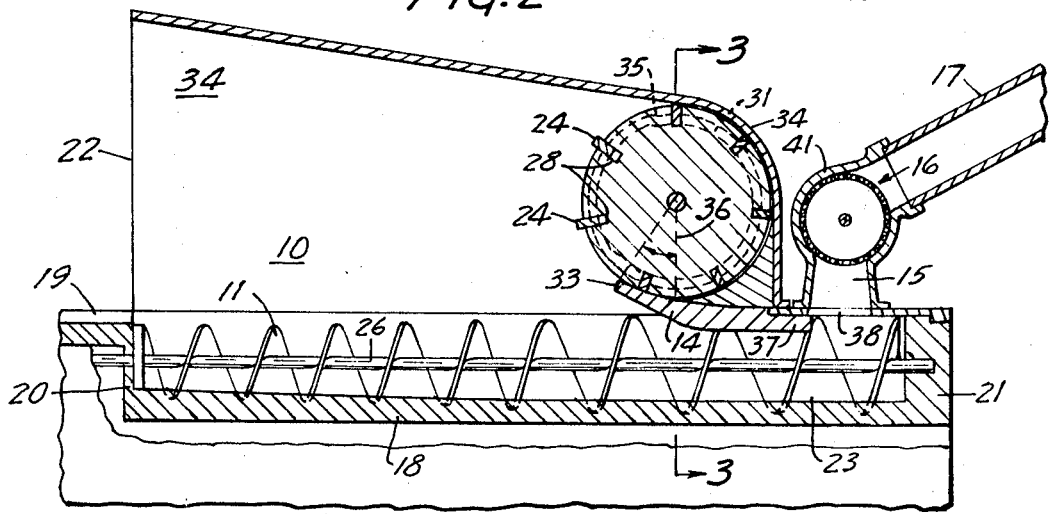
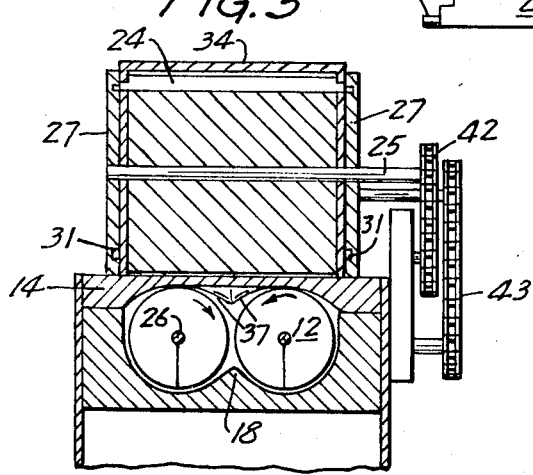
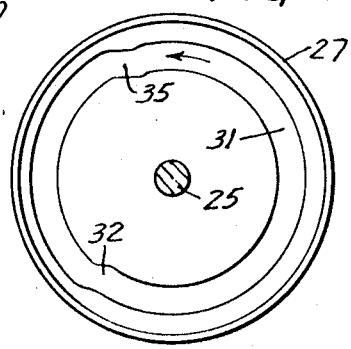
INVENTOR
CHARLES T. LINDER
Robert C. Baker
ATTORNEY

APPARATUS FOR TREATMENT OF PLASTIC MATERIAL

This invention relates to new and improved apparatus for the treatment of plastic material, and more particularly to improved apparatus for feeding and moving plastic material into and through a conduit.

This apparatus is especially useful for handling butter. Butter has a balance of properties making it highly desirable as a food ingredient and as a lubrication or release material in cooking. However, the very properties of butter which make it desirable for such purposes also contribute to handling problems in processing. Butter is slippery. Its lubricity or slipperiness may be decreased by lowering its temperature (for example, to 45° F. or to 32° F., or even lower); but this is accompanied by a reduction in plasticity, which introduces problems in terms of feeding it into a conduit at a uniform rate. Its plasticity can be improved for feeding purposes by temporarily elevating it toward room temperature or 70° F. (22° C.), or even somewhat higher; but such early elevation of temperature in processing is not especially desired where maximum preservation of edibility is the objective. Butter does melt or become substantially liquid in character at a temperature approximating or below the body heat temperature of about 98° F.; but the feeding or movement of butter at such temperatures is normally highly undesired, even though a liquid material is easily moved through conduits. Despite such problems, the properties of butter are so highly desired from the edibility standpoint that they are widely imitated, insofar as it is realistically possible to do so, in the making of a variety of relatively economical butter substitutes.

Apparatus of the present invention is useful not only for the handling of edible plastic material such as butter (whether bulk storage butter or continuous churn butter), but also for the handling of other plastic materials, especially plastic edibles, including but not limited to butter substitutes (e.g., oleomargarine). Such materials are properly characterized as plastic at room temperature and at temperatures below room temperature, down to at least about 32° F., and sometimes even lower.

Economical controlled feeding and movement of such plastic materials into and through treatment apparatus is a problem to which this invention provides a solution. The invention provides improved feed means for the controlled and substantially uniform movement of plastic material into and through a conduit system, especially a closed conduit system, as is preferred. A conduit system is termed "closed" herein to indicate that it is in the nature of a pipe as distinguished from a trough. The improved feed means is effective even when the plastic material is relatively stiff, as is characteristic of butter at the lower temperatures of bulk storage. Thus, the apparatus permits handling and treatment at preferred temperatures approximating those for bulk storage (e.g., 35° F., or possibly 45° F.), as well as, if desired, at somewhat higher temperatures, around 50° F. or 55° F.

The improved apparatus of the invention obviates the problem of intermittent butter buildup in an open hopper. Such intermittent buildup has been found to occur when feeding bulk butter from storage into reconstituting apparatus such as, for example, the "Benhil Microfix" of Maschinenfabrik Hans Lenze K.G., of West Germany. The result is that bulk butter in that known apparatus moves in spurts or moves irregularly, with portions of the butter therefore subjected to excessive working in the hopper itself and, as a consequence, needlessly heated in the hopper. Further, intermittent butter buildup in the hopper of that apparatus also causes inconsistent incorporation of air in the butter at the hopper location, and introduces problems in getting the proper weight for butter prints (e.g., quarter-pound or 1-pound prints) for packaging. In the apparatus of this invention, however, controlled and substantially uniform feeding of bulk butter, even at temperatures approximating bulk storage temperatures, causes substantially uniform treatment for all portions of the butter passed through the apparatus, with minimum or nominal variations of quality, density and the like.

To be especially noted is that the helical screw feeder of the aforenoted "Benhil Microfix" apparatus does not provide fully satisfactory results, particularly when the input bulk butter (or similar plastic) is placed in the hopper of the apparatus at a temperature around 40° F. or lower. Even the utilization of a vaned drum in combination with helical screws for feeding from a hopper, unless further provided with a special shoeplate arrangement as described herein, has been found to provide unsatisfactory results in terms of machine performance and wear. But the specialized shoe arrangement, combined with helical screws and a vaned drum as described herein, is extraordinarily effective for the feeding of plastic material over a wide temperature range into a conduit system. This improved feeding assembly makes it possible to feed plastic without heating the surface contacted by the plastic material; but, of course, the apparatus improvements herein may be used with such heating, if desired, although such is not preferred.

The invention will further be described by reference to a drawing made a part hereof wherein:

FIG. 1 is a schematic top plan view of apparatus of the invention with portions broken away for illustration of interior elements;

FIG. 2 is a schematic sectional view taken on lines 2—2 of FIG. 1;

FIG. 3 is a schematic sectional view taken on lines 3—3 of FIG. 2;

FIG. 4 is a schematic view illustrating a cam track arrangement for the drum vanes of the apparatus; and FIG. 5 is a schematic side view of a drum vane.

Elements of apparatus shown in the drawing include a hopper 10, feed means comprising at least one or two rotatable helical screws 11 and 12 together with a vaned rotatable drum 13 cooperative with the helical screws, a shoe support or plate member 14 interposed between the drum 13 and screws 11 and 12, a conduit system 15, treatment (e.g. blending or beater) means 16 within the conduit system, and a discharge opening at the end of the conduit section numbered 17.

Referring to FIGS. 2 and 3, the bottom 18 of the hopper is suitably contoured to accommodate two helical feed screws 11 and 12. The hemicylindrical contour of the hopper bottom 18 about each helical screw helps to prevent caking of plastic material on the hopper bottom as plastic is moved by the screws through the apparatus. At the entrance to the hopper 10, a table surface 19 may be provided for sliding the plastic conveniently into the hopper 10 and upon the helical screws 11 and 12.

Both helical screws 11 and 12 in the hopper 10 are suitably journaled in bearing housings 20 and 21 and provided with means (not shown) for rotating them in opposite directions as illustrated by the arrows in FIG. 3. To be noted is that the diameter of the helical screws is smaller (for example, suitably 6.5 inches in diameter) at the end near the entrance 22 of the hopper and gradually becomes larger (for example, 8.5 inches) toward the exit or discharge end 23 of the hopper. The discharge end 23 of the hopper also comprises the entrance 23 to the closed conduit system 15.

Disposed above the helical screws 11 and 12 is a rotatable drum 13 having in the periphery thereof a plurality of axially aligned radially extensible and retractable vanes 24. Seven such vanes 24 are shown in the drum 13 illustrated in the drawing. These vanes 26, in the radially extended condition, are adapted to press plastic material in the hopper toward the helical screws 11 and 12. The drum 13 itself is on an axis 25 transverse to the axis 26 of helical screws 11 (and therefore helical screw 12 also); and the shaft or other axis means 25 on which the drum 13 rotates is journaled in any suitable bearing arrangement or housing 27 at each end of the drum. In general, the rotation of the drum will be at a rate of revolutions per minute not over about one-half the rate of revolutions per minute for the helical screws or augers 11 and 12, drum rotation as low as 2 or 3 revolutions per minute being frequently quite satisfactory. Further, the diameter of the drum 13 is preferably substantially greater than the diameter of the helix for screws 11 and 12. A drum diameter at least twice (up to three or four times) that for the screws is desirable. However, a drum diameter as small as about two-thirds that for the screws is satisfactory for the processing of plastic of relatively higher plasticity than that characteristic for butter at bulk storage temperatures. To be observed is that the periphery of the drum 13 nearest the helical screws is spaced from the arc traversed by the helix of the screw. This spacing is necessary for the shoeplate 14, and is preferably just sufficient to accommodate shoe plate 14. Thus the spacing is properly characterized as a proximate spacing for accommodating the shoe 14.

A plurality of recesses 28 are located in the periphery of the drum 13. These are axially aligned longitudinal recesses. Within each recess 28 is located an axially aligned radially extensible and retractable vane 24. Each vane 24 is shaped more or less as illustrated schematically in FIG. 5 and is equipped with a cam pin 29 and 30 at each end. Cam pins 29 and 30 extend outwardly from the ends of drum 13. Each pin 29 and 30 rides in a cam track 31 (see FIGS. 2 and 4) provided in each drum housing 27. Cam tracks 31 are arranged so that, as the drum 13 rotates in the direction illustrated by the arrow in FIG. 2, the vanes 24 are, at a selected point in drum rotation, radially extended outwardly from the periphery of the drum and function as hands or surfaces to push plastic material toward the helical screws 11 and 12. The path of cam tracks 31 moves radially inward at a location 32 to force or pull the pins 29 and 30 of the vanes 24 radially inward at a set point in the rotation of drum 13. This latter point is in close proximity to the leading edge 33 of shoeplate 14. The radially inward cam track portion 32 serves to withdraw or retract the vanes 24 within the peripheral drum recesses 28 just prior to the time the peripheral surface of the drum passes over the leading edge 33 of the shoe 14. Cam tracks 31 maintain the vanes 24 in the withdrawn condition, preferably flush with the periphery of the drum, during the portion of drum rotation over the shoe 14 and any further portion of rotation of the periphery of the drum in close clearance to a cover plate or hood cover 34. The path for cam tracks 31 changes direction again at a suitable point 35 at least prior to the downward thrust of the drum periphery which is exposed to the interior of the hopper 10. This, in turn, causes radial extension or protrusion of the vanes 24 to place them in the position to press plastic material toward the helical screws 11 and 12 as the drum periphery exposed to the hopper moves toward the screws. Between the directional changes 32 and 35 of the cam tracks 31, the path of the cam tracks 31 are substantially concentric to the axis 25 of drum 13.

A hood or cover 34 over the drum 13 extends toward the entrance 22 of the hopper 10 and defines the upper and lateral edges of that entrance. Preferably, the space between the helical screws 11 and 12 and the hood 34 itself will gradually diminish from the entrance 22 of the hopper 10 to the portion of the hopper where the vaned drum 13 is located. This aids in confining the bulk plastic introduced into the hopper 10, but is not an especially critical feature, even though it is preferred.

The shoeplate member 14 interposed between the helical screws 11 and 12 and the drum is of a special character. It preferably is equipped with a blunt leading edge 33 which is preferably substantially parallel to the axis of the drum 13 and is located adjacent the periphery of that drum. This blunt leading edge 33 possesses great strength and is not easily damaged. Equally significant is the fact that it, contrary to what might be expected, does not interfere with smooth movement of the plastic pressed downward by the drum vanes 24. In terms of a radial angle of drum 13, this blunt leading edge 33 is located between about 5° and 30° toward the open hopper area from a plane 36 (illustrated by a broken line in FIG. 2) through the drum axis 25, said plane also being perpendicular to the axis of the helical screws 11 and 12. In other words, a plane 36 within which the drum axis 25 lies (i.e., the plane depends downwardly along said drum axis) and which is also perpendicular to the helical screws 11 and 12, forms the base plane from which the drum radial angle of location for the blunt leading edge 33 is measured.

The shoe 14 is suitably provided with hemicylindrical contours 37 on its under side to accommodate and mate to the arc of motion traversed by each helical screw. Thus, caking of material is minimized. These contours 37 extend in a graduated manner toward the blunt leading edge 33. At edge 33, the hemicylindrical contour of the underside is unnecessary and even undesired where maximum smooth feeding movement of plastic is the objective. Thus, the underside gradually assumes the hemicylindrical contour as one moves from the blunt leading edge 33 toward the trailing portion 37 of the shoe 14. Trailing portion 37 forms a part of the walls at the discharge end of the hopper and entrance 23 to the conduit system. Plastic material passing under the blunt leading edge 33 is gradually forced into spaces between the lateral surfaces of the helix of each helical screw 11 and 12, and then is forced into the conduit system 15.

The special shoe 14 protects the drum 13 and its mounting from being exposed to the intense pressures exerted by the plastic material at the precise areas of its forced movement toward the discharge end 23 of the open hopper and into the closed conduit system. The shoe 14 itself, at its advanced leading edge, performs somewhat of a drum periphery function in that the plastic is moved under it toward the helical screws. Longer wear for the drum and its mounting is achieved; and the significant result is that an economical feed arrangement is provided which is nevertheless highly effective for the feeding or movement of relatively stiff plastic into a closed conduit system. This is accomplished without need for any gear-type feeder or analogous positive displacement feeder. Further, the feeding or movement of the plastic into the closed conduit system 15 is accomplished with a minimum of working of it, or mastication of it, in the exposed hopper part of the apparatus. It therefore is possible to maintain the plastic at a relatively lower temperature for a longer period of time during processing, as is desired. Further, problems with respect to inconsistent incorporation of air at the hopper are minimized or even obviated.

In a true sense, the graduated contoured underside walls of the shoeplate 14, as well as the walls of the hopper bottom 18 contoured about the helical screws 11 and 12 immediately adjacent the shoe 14, from the entrance 23 to the closed conduit system 15 of the apparatus. Thus, the ends of helical screws 11 and 12 toward which material is urged extend into the throat or entrance 23 to the closed conduit system. An opening 38 is provided for material to pass from the helical screw housing into attached conduit 15.

Plastic within closed conduit 15 moves through beater means 16 for continuous treatment of plastic material as it is under continuous movement entirely within the closed conduit system. Beater 16 suitably consists of a rapidly revolving sleeve 39 having a plurality of openings 40 through it and a cylindrical housing 41 for the sleeve 16. The axis of housing 41 and sleeve 16 is normally substantially transverse to the direction of plastic through conduit 15. If desired, other means for beating or blending, or even otherwise treating, the plastic may be employed in addition to, or as a substitute for, the means shown. From the treatment portion of the closed conduit system, the plastic moves up and out a discharge conduit 17. Movement of the plastic through the entire system at a controlled uniform rate is conveniently accomplished by the improved feed means illustrated and described.

In normal practice, the surfaces of the apparatus contacted by edible plastics will be formed of materials such as nickel-silver alloys, stainless steel, aluminum, or tough synthetics such as Teflon (polytetrafluoroethylene). A low adhesion or "release" surface such as Teflon is especially desirable as a coating on the vanes 24.

Any suitable motive means and power trains may be employed to cause rotation of the helical screws 11 and 12, the drum 13 and beater sleeve 39. The chain drives 42 and 43 shown in the drawing are merely illustrative.

Although the feed means taught herein is most ideally employed where a closed conduit system is being supplied with plastic material, the teaching is also suitably employed where other conduit systems, including open conduit systems, are supplied with plastic.

That which is claimed is:

1. In apparatus comprising a hopper having an open mouth for reception of plastic material, a conduit having its entrance end connected to the discharge end of said hopper, feed means including at least one rotatable helical screw in the bottom of said hopper for moving plastic material from said hopper into said conduit, and treatment means for said plastic within said conduit, the improvement in said feed means consisting essentially of: (i) a rotatable drum having in the periphery thereof a plurality of axially aligned radially extensible and retractable vanes, said vanes in the radially extended condition being adapted to press plastic material in said hopper toward said helical screw, said drum being disposed in proximate spaced relationship above said screw on an axis transverse to the axis of said screw, at least a portion of the vane-carrying periphery of said drum being exposed to the interior of said hopper adjacent the discharge end of said hopper, (ii) a shoeplate member interposed in said space between said helical screw and said drum, with said shoeplate member having a blunt leading edge substantially parallel to the axis of said drum and lying adjacent the periphery of said drum, said blunt leading edge being located, in terms of a drum radial angle, between 5° and 30° toward said hopper from a base plane perpendicular to said helical screw within which said drum axis lies, (iii) means for radially extending said drum vanes outwardly from the periphery of said drum for pressing plastic toward said helical screw in the portion of the drum rotation exposed to the interior of the hopper, and (iv) means for retracting said vanes prior to passage of said drum periphery over said blunt leading edge of said shoeplate member.

2. In apparatus according to claim 1, the further improvement characterized by the fact that the underside of the shoeplate member is gradually contoured from its blunt leading edge to its trailing portion, said underside being free of any hemicylindrical shape at its blunt leading edge and being equipped at its trailing portion with a contour accommodating and mated to the arc of motion traversed by said helical screw.

3. In apparatus according to claim 1, the further improvement comprising a polytetrafluoroethylene coating on at least the part of said vanes of said drum exposed to contact with said plastic material.

4. Apparatus for handling plastic material, comprising feed means for continuously moving said plastic material from an open hopper into a closed conduit system within which said plastic material is maintained under continuous movement, beater means for continuous treatment of plastic material as it is under continuous movement entirely within said closed conduit system, and exit means for passage of said plastic material out of said closed conduit system, wherein said feed means for movement of plastic material includes at least one helical screw, a vaned rotatable drum in proximate spaced relationship to and cooperative with said helical screw to accomplish said movement, the vanes of said drum being in the periphery thereof and being axially aligned and radially extensible and retractable, and a shoeplate member interposed between said drum and said helical screw, with the leading edge of said shoeplate member substantially parallel to the axis of said drum and lying adjacent the periphery of said drum, said leading edge being located, in terms of a drum radial angle, between 5° and 30° toward said hopper from a base plane depending downwardly along said drum axis and perpendicularly intersecting the axis of said helical screw.